(12) United States Patent  
Keshavaraj et al.

(10) Patent No.: US 7,951,437 B2  
(45) Date of Patent: May 31, 2011

(54) MULTILAYER FILM DRY LAMINATION OF AIRBAG FABRICS

(75) Inventors: Ramesh Keshavaraj, Peachtree City, GA (US); Dany F. Michiels, Haaltert (BE)

(73) Assignee: Milliken & Company, Spartanburg, SC (US)

( * ) Notice: Subject to any disclaimer, the term of this patent is extended or adjusted under 35 U.S.C. 154(b) by 996 days.

(21) Appl. No.: 11/525,303

(22) Filed: Sep. 22, 2006

(65) Prior Publication Data

US 2008/0075903 A1 Mar. 27, 2008

(51) Int. Cl.  
*B29D 22/00* (2006.01)  
*B29D 23/00* (2006.01)  
*B32B 1/08* (2006.01)

(52) U.S. Cl. ............... 428/35.7; 428/35.9; 428/36.6; 428/36.1; 428/474.4; 428/479.3; 280/728.1; 280/730.2; 280/743.1; 442/76

(58) Field of Classification Search ............... 428/35.7, 428/35.9, 36.6, 36.1, 474.4, 479.3; 280/728.1, 280/730.2, 743.1; 442/76  
See application file for complete search history.

(56) References Cited

U.S. PATENT DOCUMENTS

| | | | |
|---|---|---|---|
| 4,224,375 A | 9/1980 | Veiga et al. | 428/315 |
| 4,259,384 A | 3/1981 | Veiga et al. | 428/97 |
| 5,110,666 A | 5/1992 | Menzel et al. | 428/196 |
| 5,298,303 A | 3/1994 | Kerr et al. | 428/35.7 |
| 5,302,432 A | 4/1994 | Shigeta et al. | 428/36.1 |
| 5,622,662 A | 4/1997 | Veiga et al. | 264/45.3 |
| 5,707,711 A | 1/1998 | Kitamura | 428/193 |
| 5,763,330 A | 6/1998 | Bertolucci et al. | 442/65 |
| 6,169,043 B1 | 1/2001 | Li | 442/71 |
| 6,177,365 B1 | 1/2001 | Li | 442/71 |
| 6,177,366 B1 | 1/2001 | Li | 442/71 |
| 6,239,046 B1 | 5/2001 | Veiga et al. | 442/76 |
| 6,350,709 B1 | 2/2002 | Veiga | 442/71 |
| 6,429,155 B1 | 8/2002 | Li et al. | 442/76 |
| 6,455,449 B1 | 9/2002 | Veiga et al. | 442/218 |
| 6,458,724 B1 | 10/2002 | Veiga et al. | 442/76 |
| 6,502,853 B2 | 1/2003 | Keshavaraj | 280/729 |
| 6,630,220 B1 | 10/2003 | Veiga | 428/102 |
| 6,641,686 B1 | 11/2003 | Veiga et al. | 156/73.1 |
| 6,645,565 B2 | 11/2003 | Veiga | 427/407.1 |
| 6,713,131 B2 | 3/2004 | Blackwood et al. | 427/387 |
| 6,734,123 B2 | 5/2004 | Veiga et al. | 442/149 |
| 6,734,125 B2 | 5/2004 | Veiga | 442/203 |
| 6,740,607 B2 | 5/2004 | Veiga et al. | 442/149 |
| 6,753,275 B2 | 6/2004 | Veiga | 442/164 |
| 6,770,578 B2 | 8/2004 | Veiga | 442/164 |

(Continued)

FOREIGN PATENT DOCUMENTS

EP 1 518 761 3/2005

OTHER PUBLICATIONS

European Search Report dated Nov. 26, 2007. Application No./Patent No. 07017736.5-2421.

*Primary Examiner* — Michael C Miggins  
(74) *Attorney, Agent, or Firm* — Cheryl J. Brickey

(57) ABSTRACT

An inflatable automotive protective cushion and method of formation. The protective cushion includes a multilayer film coating with an adhesive layer and an overlying barrier layer. The adhesive layer is adapted to bond to a textile substrate and the barrier layer is adapted to block air permeability.

9 Claims, 4 Drawing Sheets

U.S. PATENT DOCUMENTS

| | | |
|---|---|---|
| 6,837,517 B2 | 1/2005 | Keshavaraj ................ 280/743.1 |
| 6,908,528 B2 | 6/2005 | Hayes ........................ 156/307.1 |
| 2002/0022420 A1 | 2/2002 | Veiga et al. ..................... 442/76 |
| 2002/0033589 A1 | 3/2002 | Barnes ....................... 280/728.1 |
| 2002/0098755 A1 | 7/2002 | Veiga ............................. 442/76 |
| 2002/0145276 A1 | 10/2002 | Veiga ........................ 280/743.1 |
| 2002/0175510 A1 | 11/2002 | Veiga ........................ 280/743.1 |
| 2002/0187696 A1 | 12/2002 | Veiga et al. ..................... 442/76 |
| 2003/0027474 A1 | 2/2003 | Hayes ........................... 442/149 |
| 2003/0040238 A1 | 2/2003 | Li ................................... 442/76 |
| 2003/0060104 A1 | 3/2003 | Veiga ............................. 442/76 |
| 2004/0029468 A1 | 2/2004 | Kim et al. ...................... 442/76 |
| 2007/0065614 A1* | 3/2007 | Schulthess .................. 428/36.1 |

\* cited by examiner

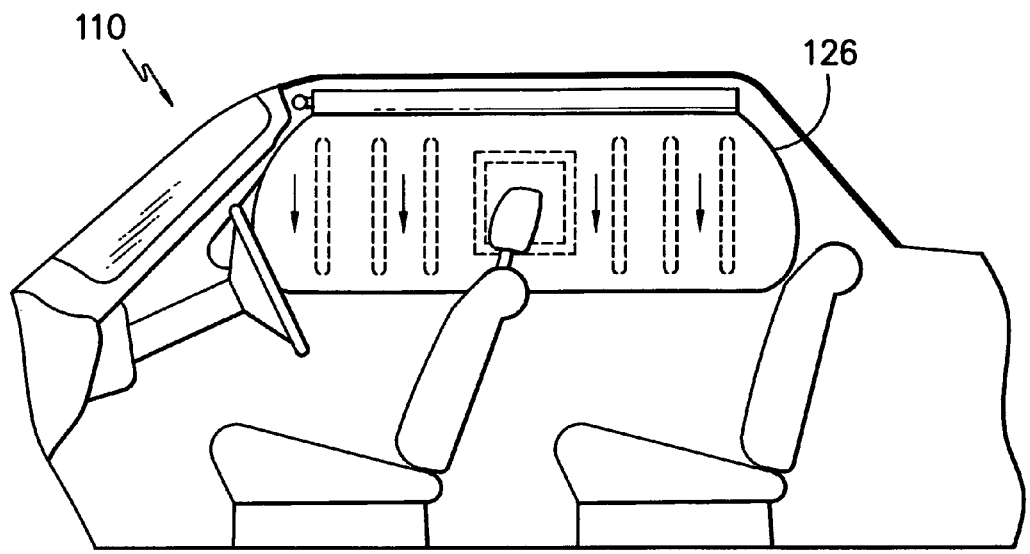
FIG. -1-
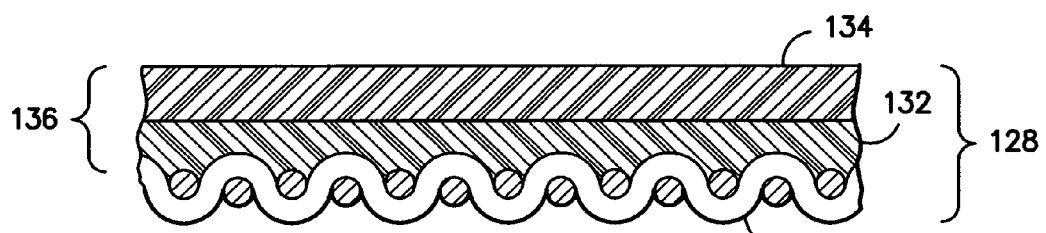
FIG. -2-
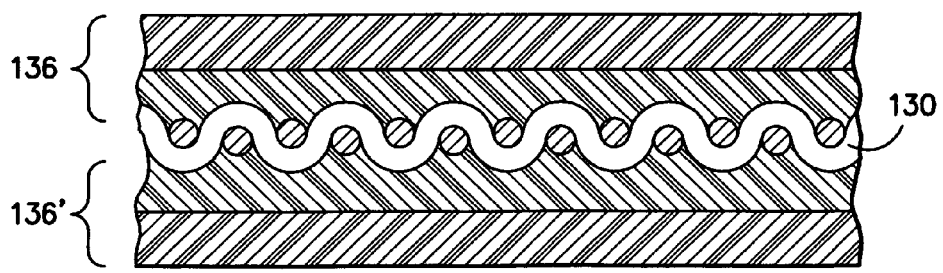
FIG. -3-

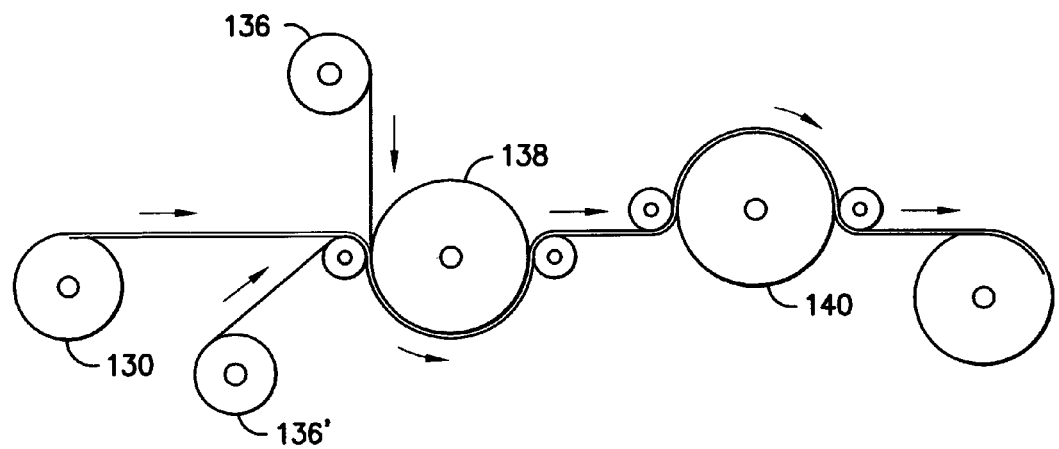
FIG. —4—
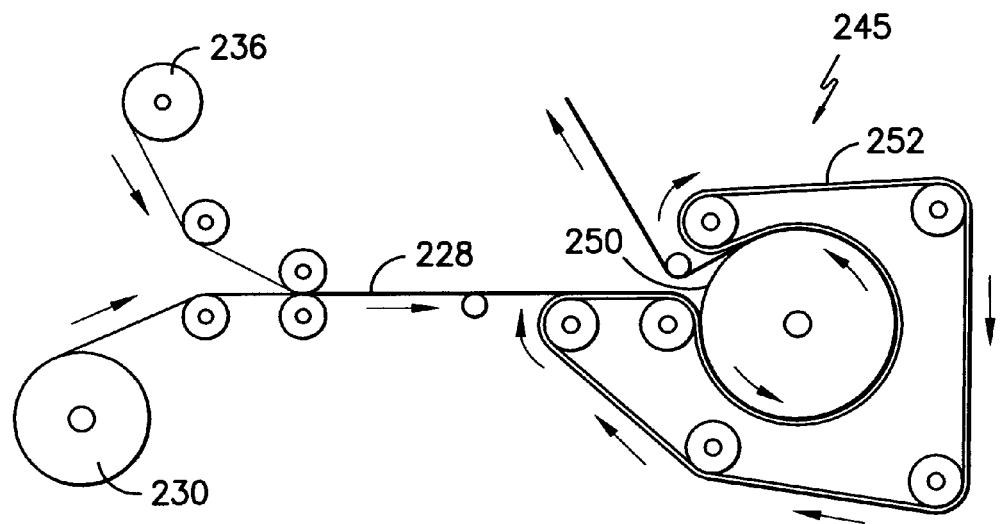
FIG. —4A—

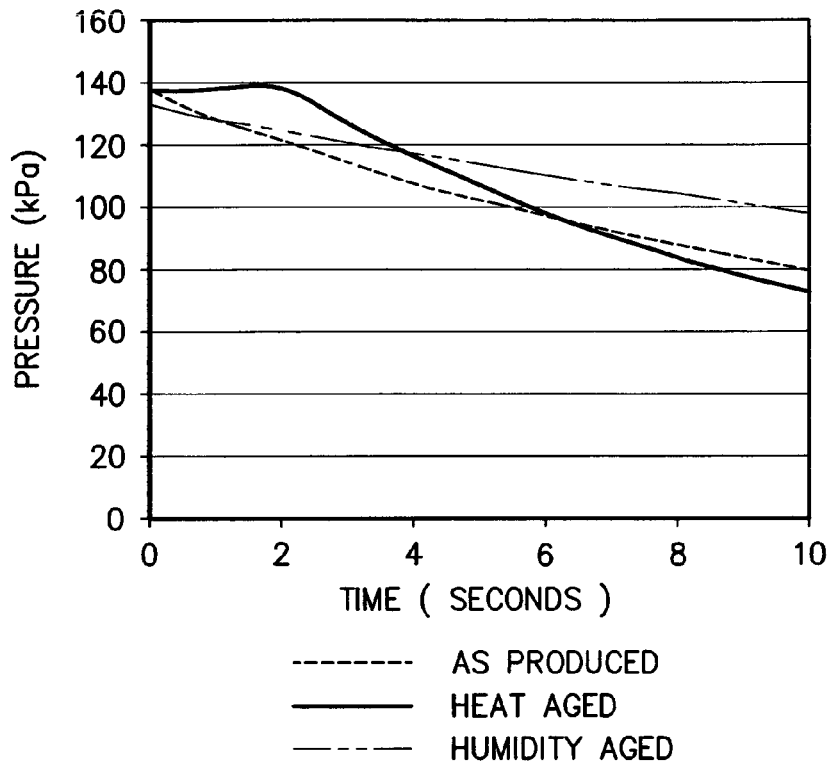
FIG. -5-
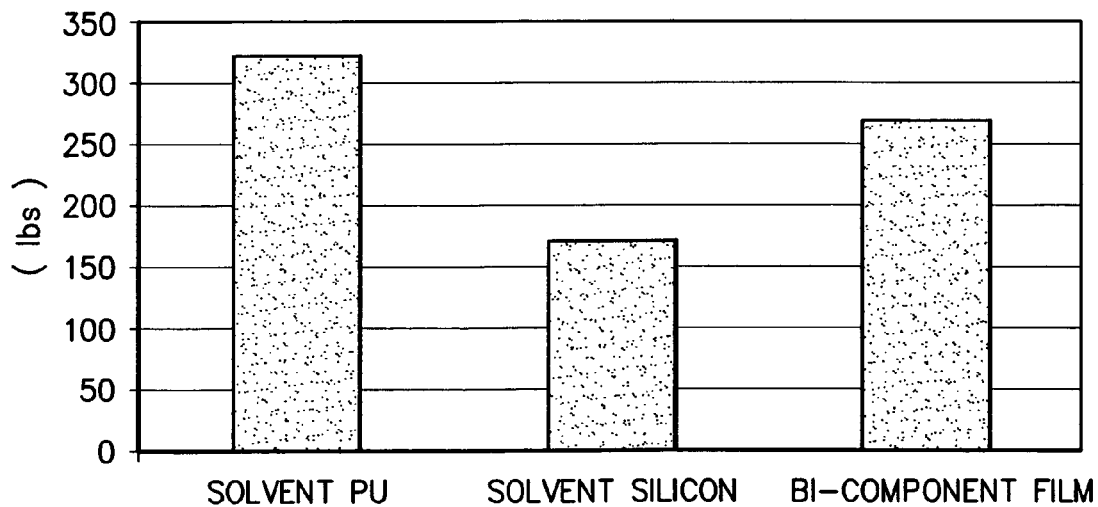
FIG. -6-

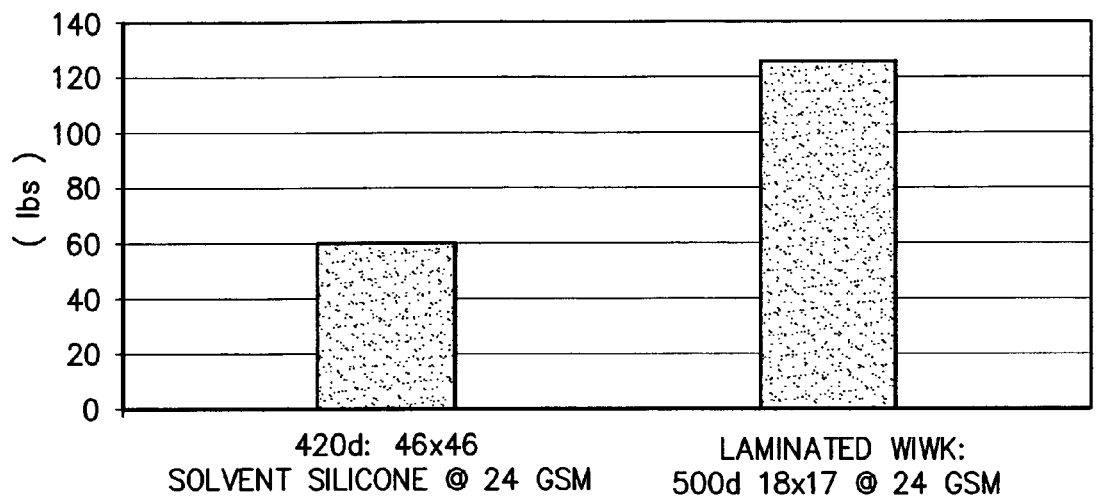
FIG. -7-
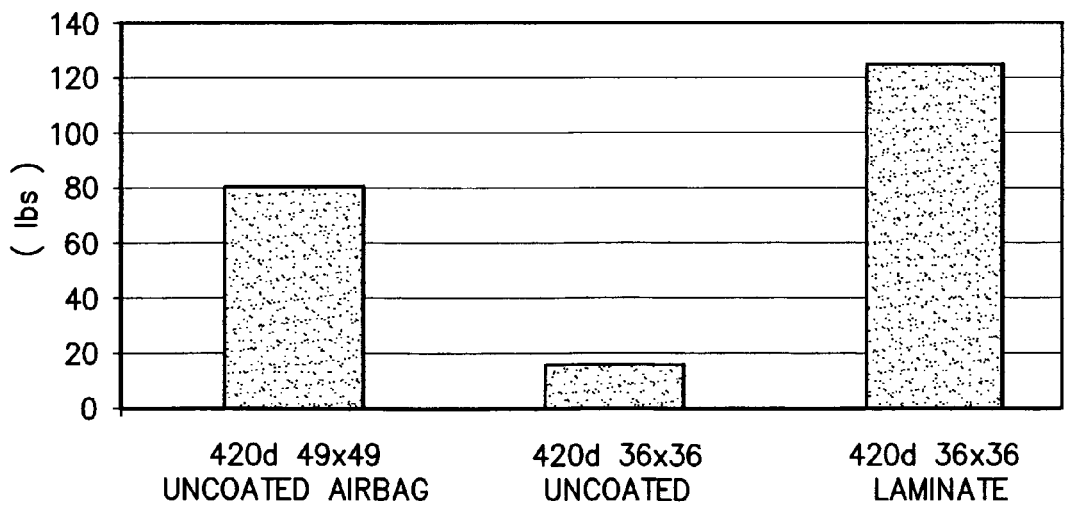
FIG. -8-

MULTILAYER FILM DRY LAMINATION OF AIRBAG FABRICS

TECHNICAL FIELD

This invention relates to automotive protective devices such as side air curtains. More particularly, this invention relates to multilayer film coatings applied to the inside and/or outside of airbag cushion fabric to reduce gas permeability of the automotive protective device. This multilayer film coating is applied by dry lamination melt bonding. Specifically, the multilayer film coatings have adhesive and sealing properties and include a first thermoplastic adhesive layer and a second barrier layer wherein the melting point of the adhesive layer is lower than the melting point of the barrier layer.

BACKGROUND

Airbags for motor vehicles are known and have been used for a substantial period of time. These devices are installed on the driver and passenger side of automobiles and, in the event of a collision, are rapidly inflated with gas, to act as an energy absorbing barrier between the driver or passenger and the steering wheel or dashboard of the automobile.

More recently, airbag safety restraints in the form of an inflatable restraining curtain disposed along the side of a vehicle between an occupant and window or door openings have played a well recognized role in preventing injury to the occupant during a collision event. Typically, such curtains are inflated rapidly by the pressure of a reaction gas released from an inflator at the outset of generating agent in the inflator induces a chemical reaction activated by a collision signal from a collision detecting sensor when deceleration of the vehicle exceeds a certain level. The gas which is generated by the inflator is then conveyed to the airbag curtain. Inflatable curtains are typically deployed downwardly from a storage position along the roof rail so as to at least partially cover window and/or door openings across the side of the vehicle. The deployed curtain thus provides both a degree of cushioning restraint as well as a barrier preventing the occupant from being ejected from the vehicle. Due to the extended duration of a roll-over collision event where the vehicle may turn over several times it is desirable for the curtain-type airbags to remain inflated for an extended period of time so as to maintain a degree of head protection and barrier restraint until the entire event is concluded.

Curtain-type airbags are typically formed by sewing together panels of fabric to form a plurality of pillows when inflated or by weaving two layers of fabric that are interconnected at certain areas in a Jacquard loom. Such pillowed fabrics typically utilize seams which control the shape and size of the inflated cushion. Upon inflation of these airbag cushions in response to a collision event, pressure is applied in great force, particularly on the seams and can result in seam combing. In this regard it is to be understood that the term "seam combing" refers to the phenomenon wherein applied pressure causes the seaming threads to spread apart and thereby release additional gas pressure.

Performance can be improved by applying substantial quantities of permeability blocking coating materials. In the past, coatings have been applied to fabrics intended for use in automotive airbags in order to resist the unwanted permeation of gas through the fabric and, to a lesser extent, to protect the fabric from detriment by the hot gases used to inflate the bags. Polychloroprene was utilized in the early development of airbags. More recently, silicone (polydimethylsiloxane or similar materials) has gained increasing acceptance.

Since the airbag must retain its integrity during a collision event, in order to sufficiently protect the driver or passenger, there is a great need to provide coatings which provide both effective permeability characteristics and sufficient restriction of seam combing for the airbag to function optimally, if and when necessary. Thus, there exists a need for providing good adhesion and a strong bond between the individual yarns in order to effectuate long-term rigidity of the fibers to prevent unraveling at cut edges or at seams while simultaneously providing aging stability and excellent low air permeability characteristics.

One approach to decreasing coating weights while maintaining low permeability performance of the airbag fabrics has been to use a two layered coating system, as disclosed for example in commonly assigned U.S. Pat. Nos. 6,177,365 and 6,177,366 to Li (all hereby incorporated by reference in their entirety). Alternative coating compositions have been disclosed based on polyurethanes, such as in U.S. Pat. No. 5,110,666 or on polyurethane/polyacrylate dispersions as found in commonly assigned U.S. Pat. No. 6,169,043 (all hereby incorporated by reference in their entirety).

Current industry practice typically utilizes conventional coating methods employing solvent or water based coatings for airbag fabrics. Consequently, the solvent or the water needs to be removed by drying and the organic polymer needs to be cured by subsequent exposure to heat. The coating method is predominantly some form of knife over air/gap or transfer coating.

An alternative approach is to laminate polymeric films to the airbag fabric. Traditional lamination methodology employs a tie coat of an adhesive layer on the fabric before film lamination. This type of approach is taught in U.S. Pat. Nos. 6,770,578, 6,908,528, and 6,753,275 (all incorporated by reference in their entirety), all of which teach application of an adhesive layer as an aqueous or solvent containing dispersion which necessitates the removal of water or solvent at a subsequent point in the process.

SUMMARY

This invention is believed to provide advantages and alternatives over prior practices by providing a method of forming a multilayer coating on airbag fabrics using lamination melt bonding of multi-component films.

According to one potentially preferred aspect, the invention provides multi-component films having a barrier layer and an adhesive layer which is the layer in direct overlying relation to the textile substrate.

According to a potentially preferred feature, the adhesive layer has a melting point at least 30° C. lower than the barrier layer in order to facilitate adhesion of the film to the textile substrate.

According to another potentially preferred feature, the glass transition temperature of this adhesive layer is preferably less than 20° C. and the softening temperature is preferably greater than 110° C.

BRIEF DESCRIPTION OF THE DRAWINGS

The accompanying drawings which are incorporated in and which constitute a portion of this specification illustrate an exemplary embodiment of the invention which, together with the detailed description set forth below will serve to explain the principles of the invention wherein;

FIG. 1 illustrates an exemplary side curtain airbag;

FIG. 2 is a cross section of a textile substrate with a multi-component film laminate disposed across one side of the textile substrate;

FIG. 3 is a cross section of a textile substrate with a multi-component film laminate disposed across both sides of the textile substrate;

FIG. 4 illustrates a lamination process in which a multi-component film is laminated to both sides of a textile substrate;

FIG. 4a illustrates a lamination process in which a multi-component film is laminated to one side of a textile substrate;

FIG. 5 is a graph of the leak rate of a bi-component film laminated one piece woven curtain airbag;

FIG. 6 is a graph of the seam combing resistance of a bi-component film dry laminated fabric compared to film laminated fabrics with solvent based adhesive layers;

FIG. 7 is a graph of the seam combing resistance of a bi-component film dry laminated weft insertion warp knit fabric compared to the same fabric film laminated utilizing a solvent based adhesive layer; and FIG. 8 is a graph of the seam combing resistance of a bi-component film dry laminated loose construction fabric compared to the same fabric uncoated.

DETAILED DESCRIPTION

Reference will now be made to the drawings wherein like reference numerals are utilized to designate like components in the various views. In FIG. 1 there is shown an interior of a vehicle 110 after inflation of an exemplary side curtain airbag 126. While the present invention will be described in relation to a side curtain airbag 126, it is to be understood that the present invention is in no way limited to such a construction. To the contrary, it is contemplated that the present invention may also find application in any number of other airbag constructions including driver side, passenger side and side impact airbags as may be desired.

FIG. 2 depicts a cross section of coated airbag fabric 128 as may be used to form at least part of the side curtain airbag 126 or other airbag as may be desired. As illustrated, the coated airbag fabric 128 preferably includes a textile substrate 130 laminated with a multi-component film 136. The multi-component film 136 includes a barrier layer 134 and an integral melt bonding thermoplastic adhesive layer 132 which is in direct overlying relation to the textile substrate 130. Of course, additional layers may also be used if desired.

The multi-component film 136 is preferably bonded to the textile substrate 130 by dry lamination melt bonding. In this regard, it is to be understood that the adhesive layer 132 is not solvent or water based as in traditional wet lamination methods. The dry lamination melt bonding occurs when the temperature is raised above the melting point of the adhesive layer resulting in a molten adhesive layer yielding a bonding between the textile substrate 130 and the barrier layer 134 when the adhesive layer resolidifies. Ideally, the adhesive layer 132 has a melting point at least 30° C. lower than the barrier layer 134.

According to the potentially preferred practice, the tensile strength of the barrier layer 134 is preferably greater than 5 N/mm$^2$ measured by EN ISO 527-3/95 test method. The elongation is preferably greater than 200% at break as measured by the above method and the modulus is preferably greater than 3 N/mm$^2$ as measured per EN ISO 527-3/95 test method at elongation greater than 100%. Tear resistance of the barrier layer is preferably greater than 35 N/mm$^2$ based on DIN 53515/77 test method. The above described properties were measured on a 20 μm thick film.

The multi-component film 136 can be either co-extruded or blown depending on the polymer system of each layer The barrier layer 134 preferably has a thickness of at least 15 μm and the adhesive layer 132 preferably has a thickness in the range of 20 to 50 μm.

By way of example only, the textile substrate 130 can be a single layer or multi layer construction such as woven fabric, knit fabric, weft insertion warp knit fabric, Rachel knit fabric and/or non-woven fabric. This includes multi-layered woven textiles which have preconfigured air holding cavities, also known as one piece woven (OPW) in the industry.

By way of example only, each layers can comprise additives, such as antioxidants, lubricants, anti-blocking agents such as silica, clay based materials, talc, etc., flame retardants that can be either halogen based or halogen-free components. Also, one layer might comprise of a coloring component to distinguish the adhesive layer from the barrier layer.

In the case of the multilayer fabrics like the one piece woven jacquard commonly utilized for air curtains, both sides of the textile substrate 130 can be laminated with the inventive multi-component film 136 sequentially in a single process. By way of example only and not limitation, an exemplary double sided lamination process is shown in FIG. 4. As shown, in this exemplary practice multi-component films 136 and 136' are laminated to opposite outer sides of the textile substrate 130. Multi-component film 136 is laminated under heat and pressure to the top side of the textile substrate 130 by contact with hot roll 138, while multi-component film 136', which is in contact with the bottom side of the textile substrate 130, away from hot roll 138, is not laminated at this point in the operation. When the film-textile-film composite is pressed against hot roll 140, multi-component film 136' is then laminated to the bottom side of the textile substrate 130. The resultant laminated product is shown in FIG. 3.

FIG. 4a shows another potential lamination process wherein components corresponding to those previously described are designated by like reference numerals in a 200 series. As shown, in this exemplary process a multi-component film 236 is laminated to one side of a textile substrate 230 via a belt calender 245. By way of example and not limitation, the multi-component film 236 is joined to the outer side of textile substrate 230 by nip rolls to form a composite structure 228 and this composite structure 228 is subjected to heat and pressure at the belt calender 245 to produce the laminated product.

As will be appreciated, the belt calender 245 utilizes of a series of small rolls which move a compression belt 252 in a continuous fashion around the large calender roll 250. The composite structure 228 is oriented so as to be pressed between the belt 252 and the calender roll 250 with the textile substrate 230 is in contact with the belt 252 and the composite structure 228 in contact with the large calendar roll 250. Heat and pressure at the large belt calendar roll 252 results in the laminated product such as that illustrated in FIG. 2.

In one potentially preferred practice, film lamination takes place at hot roll temperatures greater than the melting point of the adhesive layer 132 component of the multi-component film 136. Above said melting point, the adhesive layer 132 is preferably in a substantially flowable condition which serves to promote good bonding by causing the thermoplastic material forming the adhesive layer 132 to flow around the fiber elements forming the textile substrate 130 and into the interstices between the fiber elements. Thus, the surface fiber elements preferably become partially embedded into the adhesive layer 132. Film lamination preferably takes place at pressures from about 1 bar to about 10 bar, with pressures of about 4 bar to about 7 bar being most preferred. It is to be understood that the sequence of film laminating steps described above is exemplary only, and variations thereof are possible.

In order to further describe the present invention, the following non-limiting examples are set forth. These examples are provided for the sole purpose of illustrating some preferred embodiments of the invention and are not to be construed as limiting the scope of the invention in any manner.

EXAMPLES

A bi-component film comprising a barrier layer made form a polyether or polycarbonate based polyurethane and an adhesive layer made from a co-polyamide based resin was dry laminated to a woven jacquard fabric which was subsequently formed into a side curtain airbag. The adhesive layer was in direct overlying relation to the fabric substrate. A belt calender similar to that illustrated in FIG. 4A was used to form the laminate. The thickness of the bi-component film was 45 micron with the adhesive layer thickness being 30 µm and the barrier layer thickness being 15 µm. The woven curtain airbags were leak tested for gas retention in a rollover type of application. The curtain was inflated to a peak pressure of 137.9 kPa (20 psi) and the time taken for the bleed down to 50% of the peak pressure was recorded. The airbags were also tested for gas retention after heat aging (105° C. for 400 hours) and humidity aging (83° C. & 95% RH for 400 hours). These results are also summarized in FIG. 5.

FIG. 6 shows the seam combing resistance of dry laminated fabric versus wet laminated fabric. The graph illustrates that the adhesive layer of the dry laminated bi-component film provides adhesion as measured by the seam combing resistance test comparable to solvent based adhesive polyurethane coatings and better than solvent based silicone adhesive coatings.

Bi-component film dry lamination was also tested on weft insertion warp knit (WIWK) fabrics and lower construction woven fabrics. These types of substrates cannot be coated by traditional knife over air/gap process coatings because of the openness of the fabrics. Moreover, in order to accomplish traditional wet lamination methods utilizing solvent or water based adhesive layers, the film must be coated with the solvent based adhesive first and then laminated rather than utilizing the classical wet lamination process of applying the adhesive coating to the fabric substrate. FIG. 7 shows that the bi-component film dry lamination of a loosely constructed weft-insertion fabric substantially increases the seam combing resistance compared to wet lamination utilizing a solvent based silicone adhesive layer. Furthermore, FIG. 8 demonstrates the marked effect that the bi-component dry lamination has on seam combing resistance compared to uncoated airbag fabrics.

While the present invention has been illustrated and described in relation to certain potentially preferred embodiments and practices, it is to be understood that the illustrated and described embodiments and practices are illustrative only and that the present invention is in no event to be limited thereto. Rather, it is fully contemplated that modifications and variations to the present invention will no doubt occur to those of skill in the art upon reading the above description and/or through practice of the invention. Therefore, it is intended that the present invention shall extend to all such modifications and variations as may incorporate the broad aspects of the invention in the full spirit and scope thereof.

The invention claimed is:

1. An inflatable automotive protective cushion comprising a woven or non-woven textile substrate having at least a first multi-component film melt bonded to at least a first side of the textile substrate, wherein said multi-component film comprises:
   (a) at least one thermoplastic adhesive polymeric layer wherein said adhesive polymeric layer is in contacting relation to said textile substrate and wherein said adhesive polymeric layer comprises a co-polyamide based resin; and
   (b) a barrier layer wherein said barrier layer is the outermost layer of said multi-component film;
   wherein said adhesive polymeric layer has a melting point at least 30° C. lower than the melting point of said barrier layer, and wherein said adhesive polymeric layer has a thickness in the range of 10 to 75 µm.

2. The invention of claim 1 wherein said inflatable automotive protective cushion is a one piece woven air curtain.

3. The invention of claim 1 wherein said inflatable automotive protective cushion is a cut and sewn curtain.

4. The invention of claim 1 wherein said adhesive polymeric layer has a melting temperature less than 130° C.

5. The invention of claim 1 wherein said adhesive polymeric layer has a melting temperature less than 120° C.

6. The invention of claim 1 wherein said barrier polymeric layer has a thickness of at least 10 µm.

7. The invention of claim 1 wherein said barrier polymeric layer comprises a polyurethane based resin.

8. The invention of claim 1, further comprising a second multi-component film melt bonded to a second side of the textile substrate opposing said first side, wherein said second multi-component film comprises:
   (a) at least one thermoplastic adhesive polymeric layer wherein said adhesive layer is in contacting relation to said textile substrate; and
   (b) a barrier layer wherein said barrier layer is the outermost layer of said multi-component film; and wherein said adhesive layer in the second multi-component film has a melting point at least 30° C. lower than the melting point of said barrier layer in the second multi-component film.

9. The invention of claim 1, wherein the adhesive layer has a thickness in the range of 20 to 50 µm.

* * * * *